United States Patent [19]

Johnson

[11] Patent Number: 5,316,519
[45] Date of Patent: May 31, 1994

[54] MULTIPLE WEIGHT DRUM SHAKER

[75] Inventor: Howard B. Johnson, Woodland, Calif.

[73] Assignee: Johnson Farm Machinery Company, Inc., Woodland, Calif.

[21] Appl. No.: 879,499

[22] Filed: May 7, 1992

[51] Int. Cl.⁵ .................................................. A01F 11/00
[52] U.S. Cl. .................................... 460/96; 460/142; 460/148
[58] Field of Search ............. 460/142, 147, 148, 91, 460/92, 93, 96, 146; 56/327.1, 328.1

[56] References Cited

U.S. PATENT DOCUMENTS

| | | | |
|---|---|---|---|
| Re. 27,528 | 11/1972 | Looker et al. | 171/1 |
| 672,320 | 4/1901 | Ford | 74/604 |
| 2,280,364 | 4/1942 | Atteslander | 74/604 |
| 2,745,238 | 5/1956 | Hopkins | 74/604 |
| 3,286,774 | 11/1966 | Lorenzen et al. | 171/1 |
| 3,331,198 | 7/1967 | Hill et al. | 56/364 |
| 3,413,789 | 12/1968 | Studer | 56/330 |
| 3,541,979 | 11/1970 | Lorenzen | 111/2 |
| 3,722,194 | 3/1973 | Halls | 56/226 |
| 3,776,046 | 12/1973 | Jones, Jr. | 74/604 X |
| 3,791,227 | 2/1974 | Cherry | 74/52 |
| 3,999,613 | 12/1976 | Porter | 171/14 |
| 4,052,992 | 10/1977 | Taylor . | |
| 4,111,210 | 9/1978 | Freeman et al. | 130/30 |
| 4,150,528 | 4/1979 | Rendin | 56/400.19 |
| 4,232,506 | 11/1980 | Studer | 56/327 |
| 4,292,792 | 10/1981 | Burton | 56/330 |
| 4,335,570 | 6/1982 | Fitzmaurice | 56/327 |
| 4,414,934 | 11/1983 | Vogl . | |
| 4,435,950 | 3/1984 | Deux et al. | 56/330 |
| 4,471,876 | 9/1984 | Stevenson, Jr. et al. | 209/618 |
| 4,570,426 | 2/1986 | Bettencourt et al. | 56/327 |
| 4,915,671 | 4/1990 | Johnson | 460/59 |
| 4,965,993 | 10/1990 | Butler et al. | 56/327.1 |
| 5,044,147 | 9/1991 | Klinner | 56/364 X |

FOREIGN PATENT DOCUMENTS 2599645 12/1987 France .

Primary Examiner—Terry Lee Melius
Attorney, Agent, or Firm—Townsend and Townsend Khourie and Crew

[57] ABSTRACT

The invention provides a drum shaker apparatus for use in seed or vine crop harvesters with improved effectiveness in removing seeds or fruit from the plant portion of the crop. The drum shaker includes a rotatable drum to which is mounted a counterweight mechanism having at least three rotatable counterweights, each counterweight having an axis of rotation spaced apart from its center of mass, and means for rotating the counterweights in a phased relationship. Usually, the drum is rotated at a constant angular speed, onto which is superimposed the oscillatory movement caused by rotation of the counterweights. The drum shaker further includes tines extending outward from its surface for engaging the crop. The present invention provides tines of varied stiffness arranged on the drum so as to create relative movement of adjacent tines, which tends to shear the seeds or fruit from the plants. The drum shaker of the present invention offers greater harvesting efficiency, compact size, reduced maintenance and longer life than known shaker-type harvesters.

25 Claims, 8 Drawing Sheets

MULTIPLE WEIGHT DRUM SHAKER

BACKGROUND OF THE INVENTION

The present invention relates generally to harvesters for tomatoes and other vine crops as well as to harvesters for seed crops such as wheat, barley, oats, rice, corn, milo, soybeans, sorghum, black-eyed peas, dried beans, safflower, Sudan grass seed, alfalfa seed and others. More specifically, the present invention relates to oscillating drum shaker apparatus utilized in the aforementioned harvesters for separating the seed kernels, fruits or vegetables from the plants of such crops.

Most seed crops have the characteristic that the crop for each plant comprises a relatively large number of small, lightweight seeds, grains or kernels (hereinafter collectively "kernels") which are attached to relatively bulky plant growths, frequently referred to as straw. To harvest the kernels they must be separated from the plants and the two are then segregated, the kernels being collected for subsequent transportation to points of use while the plants may be left on the field, burned or bundled as fodder for other uses.

Seed crop harvesters, now most commonly used in the form of self-propelled or pull-type combines, incorporate threshers which generally have a rotating cylinder the periphery of which is fitted with axially-oriented beater wings, usually provided with peripheral teeth, and a cooperating concave. The concave is trough-shaped and is defined by a multiplicity of axially-oriented, parallel bars carried by circumferential supports which are constructed to form relatively large, typically square openings through which loose kernels and chaff gravitationally drop for collection beneath the concave. Threshing is effected by passing the seed crop through a typically adjustable, closely-controlled, narrow gap between the beater wings of the cylinder and the rasp bars of the concave. As the seed crop passes through this gap the beater wings and the rasp bars mechanically strip the kernels from the straw.

A known variation on this technique of separating seed kernels from straw proposes threshing seed crops by moving them at a leisurely pace along a conveyor and subjecting the crops to vibrations, i.e., to a large number of cyclical accelerations and decelerations. The vibrations separate the kernels from plant growth by taking advantage of inertial forces between them which pull the two apart without the need for physically contacting them and stripping one from the other.

For example, U.S. Pat. No. 4,915,671 to Johnson, the full disclosure of which is incorporated herein by reference, describes an apparatus and method for threshing seed crops wherein the crop is fed onto a trough-shaped screen with openings through which seed kernels can pass, the crop being moved circumferentially along the screen by a rotating hub having a multiplicity of tines projecting radially therefrom. Superimposed on the rotational movement of the hub is a cyclical vibrational movement of rotational accelerations and decelerations. This causes the free tine ends to momentarily reverse their direction of movement as they rotate in an overall forward direction, creating a shaking action which separates the kernels from the plant and permits the kernels to work their way in a downward direction through the mass of plant growth until they reach the screen where they pass through openings for subsequent collection. The vibrational threshing device was found to enhance the yield of kernels, reduce the percentage of cracked kernels, and consume less power than was required for conventional thresher combines of comparable capacity. Further, the overall size and weight of the thresher could be reduced resulting in cost reductions in manufacturing and use.

The vibrational movement of the hub described in the '671 patent is accomplished by a vibratory drive having two counterweights secured to and rotating with corresponding shafts, which are driven by pulleys and belts from a hydraulic motor. A second hydraulic motor drives the rotation of the hub. The rotation of the counterweights superimposes onto the constant rotation of the drum a vibratory or oscillating motion which cyclically accelerates and decelerates the angular velocity of the drum.

A device similar to that described in the '671 patent has been proposed for use in tomato harvesters. U.S. Pat. No. 4,232,506 to Studer, the full disclosure of which is incorporated herein by reference, describes a method and apparatus for mechanically removing tomatoes from their vines after the vines have been severed from the roots and lifted above ground. The severed and lifted vines are fed in between a rotary drum with radially outwardly projecting rods, and stationary arcuate guide rods around the drum. The vines are shaken by subjecting them to angular acceleration and deceleration while the vines are transported around an arcuate path. The tomatoes shaken from the vines are collected, and the stripped vines are dropped back on the ground. The superposition of acceleratory motion on the constant angular velocity rotation of the drum is achieved through the rotation of two counterweights coupled to pulleys and driven by a motor.

Similarly, U.S. Pat. No. 4,335,570 to Fitzmaurice describes a harvester for vine crops such as tomatoes having a shaker head capable of being rotationally oscillated about its axis and tines adapted to engage the vines of the crop to be harvested. A support conveyor moves the vines under the shaker head while the tines of the shaker head shake the fruit therefrom. The oscillation of the shaker head is achieved using a two-counterweight mechanism, the counterweights rotationally driven by a chain coupled to a drive shaft. The shaking action is imparted by tines directly to the tomato vines causing tomatoes to separate from the vines and fall to the collection conveyors below.

While oscillating shaker-type devices like the aforementioned are relatively effective for removing the seed or fruit from the plant, it has been found that such devices impose a significant amount of undesirable vibrations on the frame of the harvester. Such vibrations vary with the speed at which the harvester is driven, and the frequency and amplitude of oscillation, but can become particularly pronounced as the resonant frequency of the harvester structure is approached. The vibration problem is further complicated by the tires and suspension on which most harvesters are carried, which act as springs, and can cause the harvester to gyrate vertically and laterally with respect to the ground.

In addition, it is generally known that for certain types of crops, a shaker-type harvester will more effectively remove the seed, fruit or vegetable from the plant if the amplitude of oscillation of the drum is increased. Oscillation amplitude is a function of the angular momentum of the rotating counterweights employed in such systems. Angular momentum is in turn dependent upon the mass of the counter-weights and their position relative to their axis of rotation. However, the mass of the counterweights is constrained by several factors. First, increasing the mass of the counterweights worsens the vibration problem discussed above. Second, the size and position of the counterweights is limited by the structural configuration of the harvester. In some harvesters, radial and/or axial clearance limits prohibit enlarging the counterweights or repositioning counterweights so as to increase angular momentum. In addition, harvester height and width must be kept within certain limits for highway transport. Further, the width of the counterweights is preferably minimized, since the counterweight mechanism and motor typically extend laterally outward from the harvester, where fast-moving, heavy machinery poses a safety hazard for people working on or near the harvester. Moreover, the overall weight of the harvester is sought to be minimized, since the ground on which the harvesters work is frequently soft. Such weight considerations further limit the size of the counterweights.

Because of these limitations on counterweight size, mass and position (and therefore oscillation amplitude), shaker performance is improved in known shaker mechanisms by raising the speed of counterweight rotation, and therefore oscillation, by running the shaker motor at a higher rpm. However, running the shaker at a higher speed accelerates wear and tear on the harvester, requiring more frequent maintenance, increasing part failures, and shortening harvester life.

Along with decreasing vibration and increasing the amplitude of shaker oscillation, improvement has been sought in the radially extending tines on the shaker drum. In known shakers, the tines are oscillated by the drum in accelerating/decelerating motion relative to the surface beneath the drum on which the plants are carried. Some plants manage to pass through the shaker without being stripped of all seeds, fruit or vegetables.

For these reasons, an improved drum shaker is desired which would eliminate the vibrational problem associated with known shakers. It would be desirable if the drum shaker provided increased oscillation amplitude without worsening vibration problems. Further, the drum shaker should not require substantial additional space for the motor and counterweight mechanism than that required for existing drum shakers. It would be further desirable if the drum shaker permitted lower speeds of operation and reduced wear and tear on components of the harvester. The drum shaker should more effectively separate seeds, fruit or vegetables from the plants to improve yield. Further, the drum shaker should not impair the safety of those working on or near the harvester.

SUMMARY OF THE INVENTION

The present invention provides an improved drum shaker for harvesting tomatoes and other vine crops as well as seed crops, such as wheat, barley, oats, rice, corn, milo, soybeans, sorghum, black-eyed peas, dried beans, safflower, sudan grass seed, and alfalfa seed and others. The drum shaker of the present invention has an improved counterweight mechanism with three or more counterweights, preferably an odd number, which increases the oscillation amplitude of the drum shaker, thereby increasing yield and allowing the shaker to be driven at a lower rpm, adding to the longevity of the machine. At the same time, the counterweight mechanism of the present invention significantly reduces the vibrational problems associated with previous drum shakers having two counterweights. The use of additional weights permits the combined mass of the counterweights to be increased, creating greater oscillation amplitude, without increasing the size of each individual weight or repositioning such weights. This permits the counterweight mechanism to be more compact and to be integrated more closely with the harvester structure, minimizing harvester size and weight and reducing the safety risk associated with a larger, protruding structure.

In one embodiment, the invention provides a shaker for use in a crop harvester comprising a drum rotatable about a first axis, a plurality of tines extending radially from the drum, and means coupled to the drum for oscillating the drum. The oscillation means comprises at least three rotatable counterweights, each counterweight having an axis of rotation spaced apart from the first axis and spaced apart from the center of mass of the counterweight, and means for rotating the counterweights in a phased relationship.

In another exemplary embodiment, the drum shaker further provides means for rotating the drum independently of the oscillation provided by the counterweights. In one embodiment, the drum is rotated by a motor, the shaft of the motor being coupled to the axle of the drum through a coupling. The coupling allows the drum to oscillate while undergoing continuous rotational movement.

In a further embodiment, the tines on the drum are provided with varied stiffness to more efficiently disengage fruit from the plant portion of crops. Usually, two types of tines are provided, a first type being relatively stiff and a second type being relatively flexible. The tines are preferably arranged in circumferential or longitudinal rows along the drum surface, with the first and second types of tines being alternated by rows. As the drum is oscillated, the more flexible tines move relative to the stiffer tines, which remain more stationary relative to the stem portions of the crop. The stiffer tines thereby help to restrain the stem portions while the more flexible tines move relative to the stiffer tines and the stems, thereby stripping the fruit from the stem. In various embodiments, the tines can be alternated by circular row, by longitudinal row, or by tine.

In a further embodiment, the tines are provided with weighted tips. Preferably, only the more flexible tines are provided with a weighted tip to enhance their motion relative to the stiffer tines as the drum oscillates.

The invention provides a drum shaker for removing seeds or fruit from the plant portion of various types of crops which has higher shaking efficiency, compact size, and substantially reduced vibration. The use of three or more counterweights rather than two counterweights as in known drum shakers allows the angular momentum of the counterweight mechanism to be increased, while keeping the overall size of the mechanism relatively compact. Such a compact design is advantageous in order to keep the overall size of the harvesting machine minimized and to avoid an excessively large counterweight mechanism protruding from the side of the harvesting machine which can pose a safety hazard for people working nearby. Further, the greater mass of the counterweight mechanism allows a greater amplitude of oscillation, permitting the counterweights to be rotated at a lower rpm, thereby prolonging the life of the shaking mechanism. The lower rpm, coupled with the larger amplitude of oscillation, also reduces damage to pressure sensitive crops such as tomatoes. In addition, the drum shaker mechanism with three or more counterweights substantially reduces the vibration imparted to the harvesting machine, reducing wear and tear on the harvester and providing smoother, more controllable operation.

The tines of varied stiffness provided by the present invention further contribute to the efficacy of the drum shaker. The relative movement of the stiff and more flexible tines adjacent to one another creates a shearing or stripping type action which substantially improves the efficiency of the drum shaker in removing fruit or seeds from the plants.

A further understanding of the nature and advantages of the invention may be realized by reference to the remaining portions of the specification and the drawings.

DESCRIPTION OF SPECIFIC EMBODIMENTS

Figure 1:
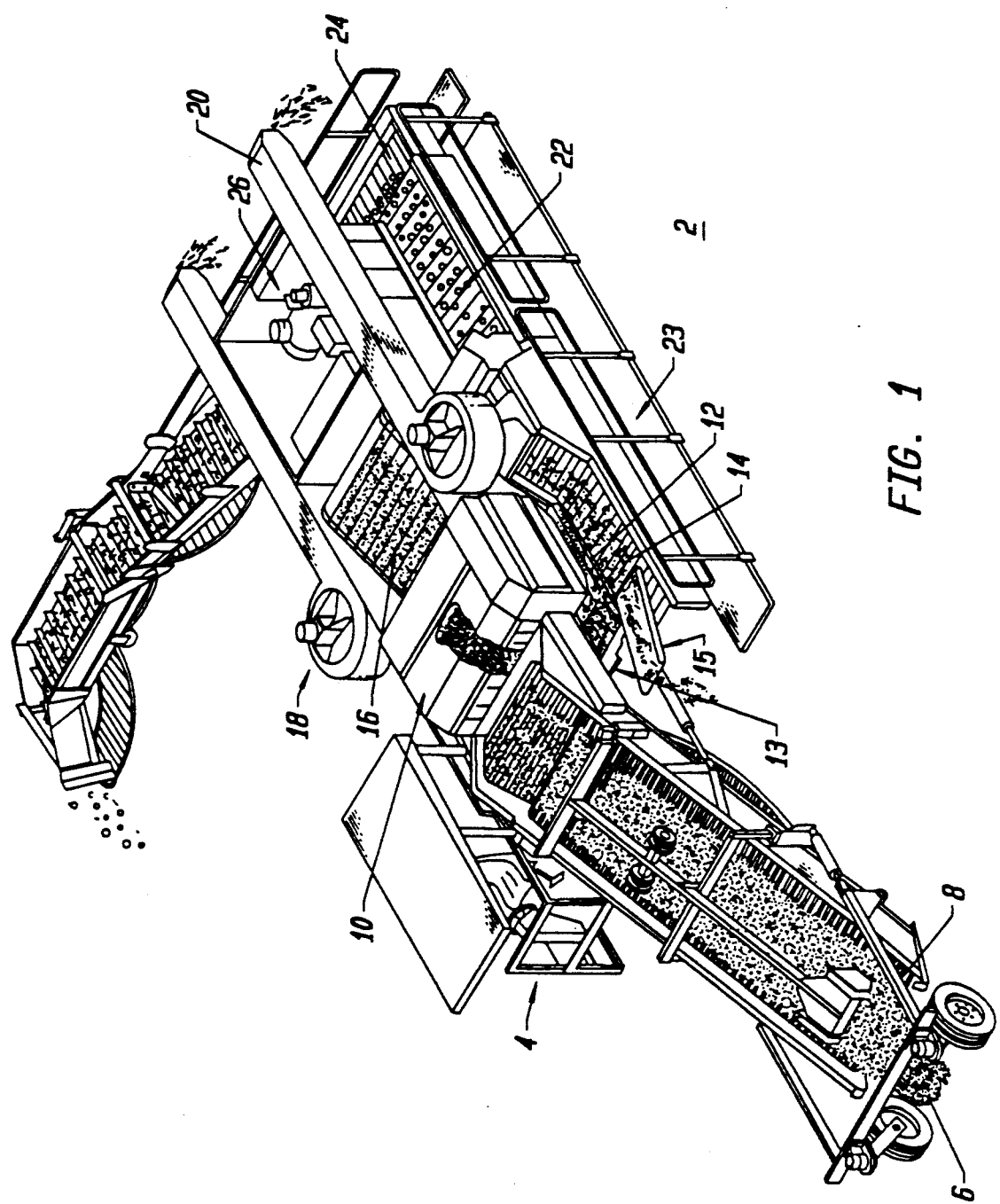
FIG. 1 is a perspective view of a tomato harvester having a drum shaker constructed in accordance with the principles of the present invention.

FIG. 1 illustrates a tomato harvester constructed in accordance with the principles of the present invention. Tomato harvester 2 is driven through a field of tomato plants under the control of an operator in cab 4. Cutters 6 at the front end of harvester 2 cut the tomato plants near the ground, and the plants with fruit attached fall onto front end conveyor 8 which transports the plants and fruit rearward in the vehicle. The plants are conveyed to drum shaker 10, which comprises a cylindrical drum having a plurality of semi-rigid tines extending radially outward from the drum surface. As will be described more fully below, the drum is oscillated in rotational accelerations and decelerations, superimposed upon a constant rotational velocity. This shaking motion causes the tomatoes to be severed from the plants, the tomatoes falling downward from drum shaker 10 to transverse conveyor 12, where they are moved laterally to conveyor 14. Soil and rocks accompanying the tomato plants on front end conveyor 8 is deposited on a second transverse conveyor 13 which transports the material laterally to conveyor 15. Conveyor 15 conveys the soil and rocks forward, and is disposed at an angle such that any tomatoes which have fallen off of the plants onto the conveyor will roll rearward to conveyor 14, while soil, rocks and other debris are deposited back on the ground.

At this point, most of the plant portions of the crop have been dropped by drum shaker 10 to vine conveyor 16, which deposits the plant material back onto the field. However, a small portion of plant material may accompany tomatoes from drum shaker 10 to conveyor 14. For this reason, suction fans 18 are mounted overhead conveyor 14, the suction force of fans 18 pulling the remaining plant material from conveyor 14 and exhausting it through ducts 20. The tomatoes on conveyor 14 pass through a sorter section 22, where unsuitable tomatoes are removed by color-based sorting. Additional sorting may be performed by operators stationed on catwalks 23. The tomatoes are then conveyed via conveyor 24 to a container carried by a truck alongside harvester 2. Power to move the harvester as well as to run the conveyor fans 18 and drum shaker 10 is provided by an engine 26.

Figure 2:
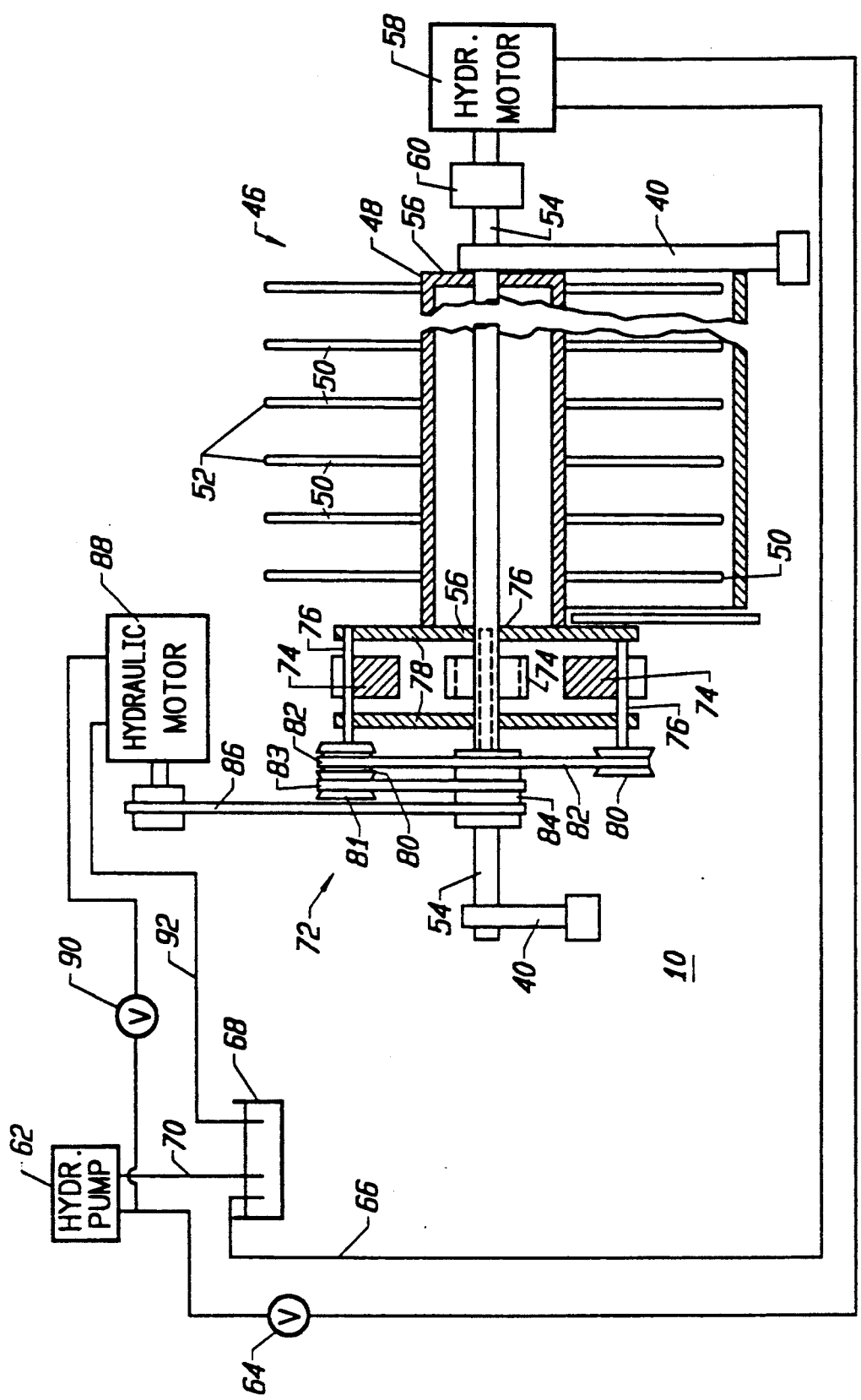
FIG. 2 is a schematic of the drum shaker of the harvester of FIG. 1.

FIG. 2 illustrates a schematic of the drum shaker mechanism 10 of the tomato harvester. Drum shaker 10 includes a vibratory drum 46 oriented transversely to the travel direction of the harvester. Vibratory drum 46 is defined by a hub 48 from which a multiplicity of elongated tines 50 project. The tines extend outward from the hub and terminate in free ends 52. Preferably, tines 52 project from hub 48 at an angle less than 90° from the tangential direction, so as to be angled slightly rearward relative to the direction of the drum's rotation. This results in deflection of plant material radially outward from the drum surface, thereby preventing vines from becoming entangled in tines 50 near the surface of hub 48.

In one embodiment of the present invention, tines 50 are relatively stiff, elongated, typically ¼" to ⅜" diameter fiber-reinforced resin rods which are suitably attached to the cylindrical hub 48 by bolting or clamping thereto (not separately shown).

The hub is secured to an elongated shaft 54 which is rotatably mounted to frame 40 of the harvester such that hub 48, and therewith tines 50, rotate with shaft 54.

A first hydraulic motor 58 drives shaft 54 via a coupling 60. Coupling 60 usually comprises a rubber biscuit, providing a limited degree of torsional resilience between hydraulic motor 58 and shaft 54. A hydraulic pump 62 delivers pressurized hydraulic fluid via a flow regulating valve 64 to the hydraulic motor 58 so that the motor speed can be adjusted. Spent hydraulic fluid is returned via a return line 66 to a reservoir 68, from which the pump draws fresh fluid via an intake line 70.

Oscillations, that is, cyclical accelerations and decelerations, are superimposed onto the hub and tines 48,50 rotated by hydraulic motor 58 with a vibratory drive 72. In one embodiment of the invention, the vibratory drive is formed by three counterweights 74 secured to and rotating with corresponding shafts 76 journalled in and extending between two spaced apart support plates 78, one of which may be attached to or form part of hub end plate 56 and both rotating with the hub and hub shaft 54. The counterweight shafts 76 are driven by corresponding pulleys 80 about which timing belt 82 is disposed. A drive pulley 81 is attached to one of shafts 76 and adjacent one of pulleys 80, with drive belt 83 extending between drive pulley 81 and drive sleeve 84 journalled on shaft 54. The sleeve in turn is driven via belt 86 from second hydraulic motor 88, which receives pressurized hydraulic fluid via a control valve 90 from hydraulic pump 62. A return line 92 is provided for flowing spent hydraulic fluid from motor 88 back to reservoir 68.

In operation, hydraulic pump 62 is energized so that hydraulic fluid flows from the pump to both hydraulic motors 58,88 via respective flow control valves 64,90. Motor 58 drives shaft 54 and rotates hub 48, including tines 50 projecting therefrom, and the support members 78.

Second motor 88 rotates counterweights 74 via belt 86, drive sleeve 84, drive belt 83, timing belt 82, pulleys 80 and shafts 76 which mount the pulleys as well as the counterweights. Preferably, the motor is driven so that the counterweights rotate in the opposite direction from the hub.

Figure 3:
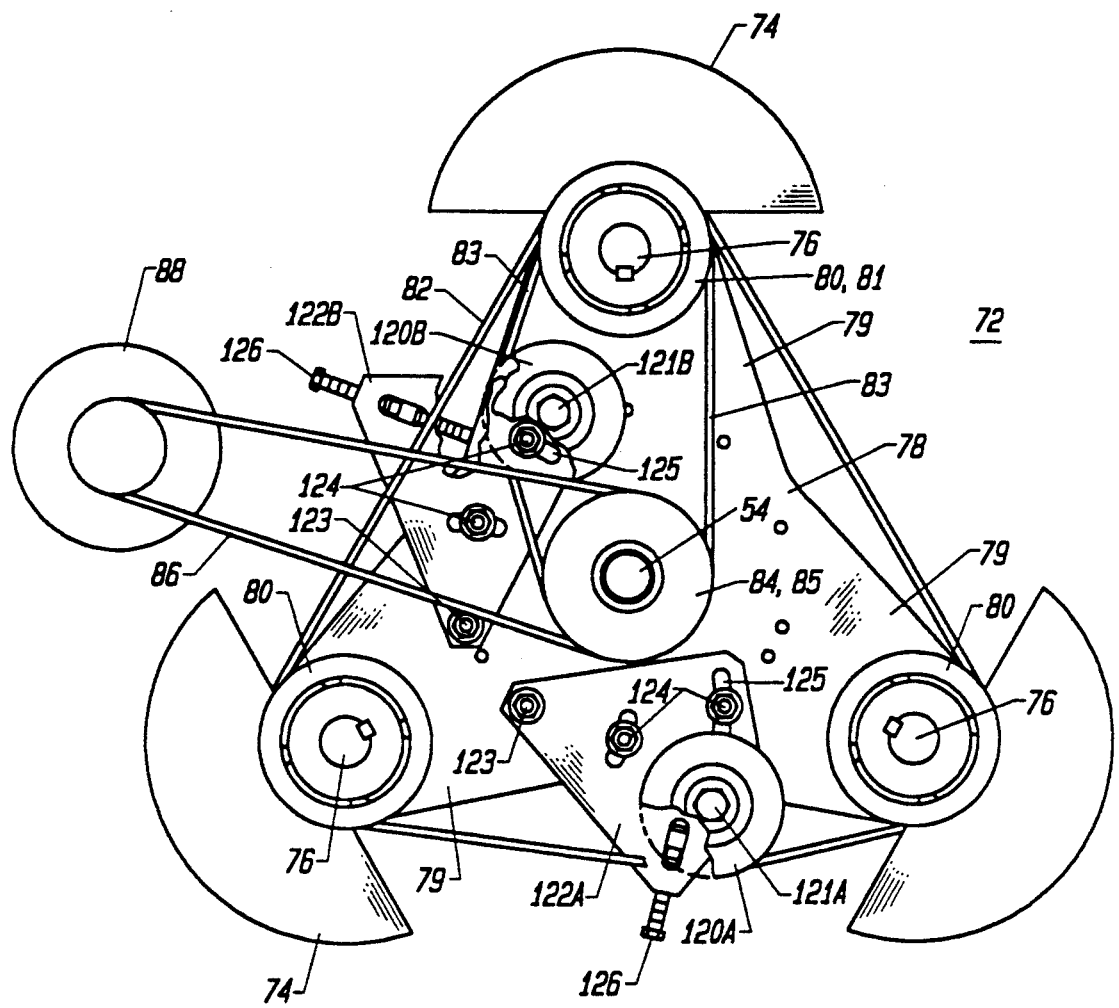
FIG. 3 is a front elevational view of the counterweight mechanism of the drum shaker of FIG. 2.
Figure 4:
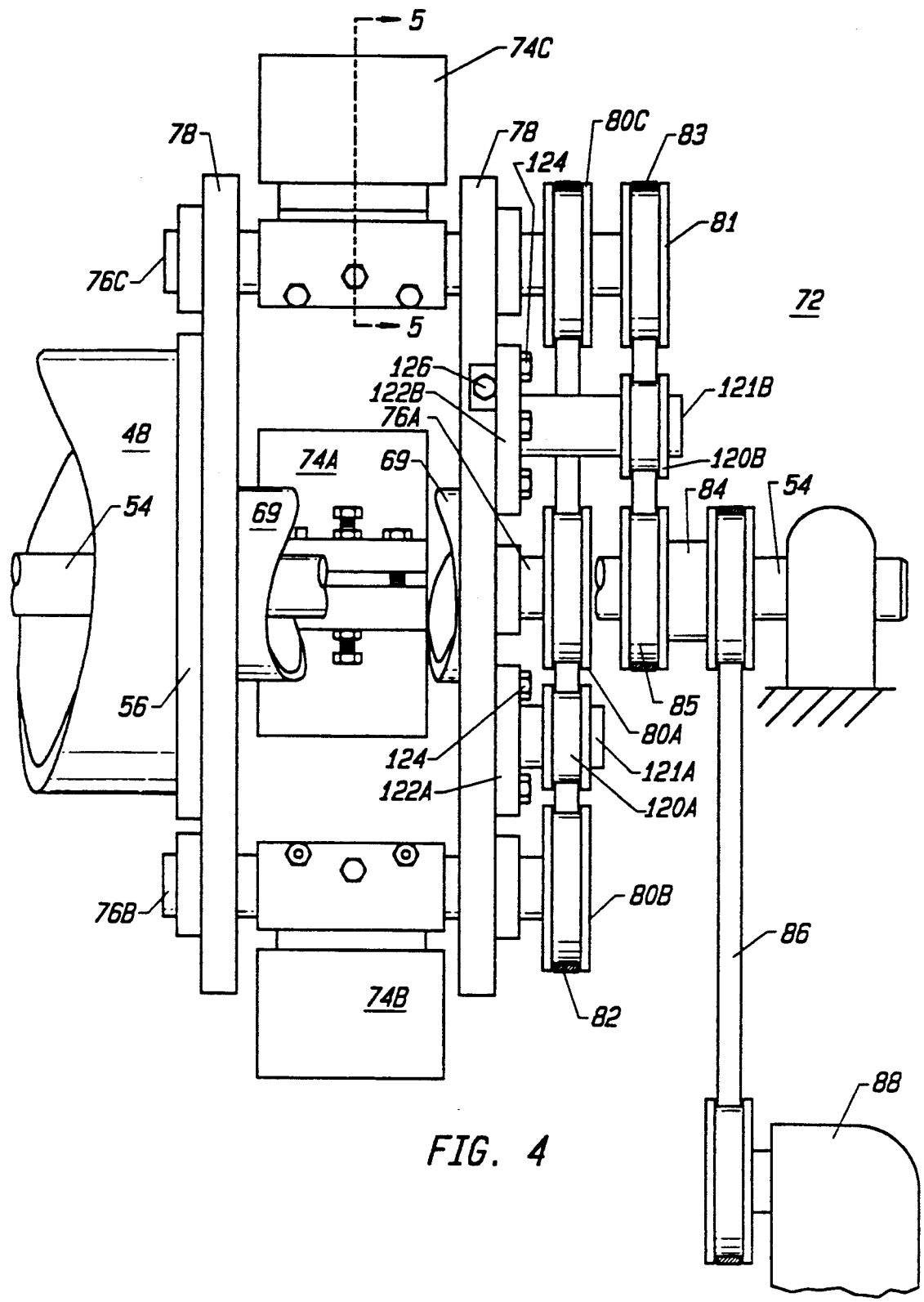
FIG. 4 is a side cross-sectional view of the counterweight mechanism of FIG. 3.

Vibratory drive 72 is illustrated in FIGS. 3 and 4. Two parallel, spaced-apart support plates 78 define three radially extending arms 79 which mount drive pulleys 80 on shafts 76 situated at the distal ends of the arms.

Support plates 78 are fixed to each other via hub 69, to which support plates 78 are welded. Idler pulleys 120A, 120B on shafts 121A, 121B provide adjustable tensioning of timing belt 82 and drive belt 83, respectively. Shafts 121A, 121B are mounted in pivot plates 122A, 122B, which are pivotable about bolt 123 and secured to support plates 78 by cap screws 124, 126 extending through slots 125 in pivot plates 122A, 122B. Adjustment screws 126 permit radial positioning of idler pulleys 120A, 120B to adjust the tension on timing belt 82 and drive belt 83, which extend around pulleys 120A and 120B, respectively once the belt tension is set, screws 124 are tightened to secure the pivot plates in place.

Support plates 78 are mounted on shaft 54 and fixed with respect to hub 48 so as to rotate therewith. Counterweights 74A–74C are keyed to shafts 76A–76C, respectively, between support plates 78. Pulleys 80A–80C are attached to shafts 76A–76C such that rotation of pulleys 80A–80C rotates shafts 76A–76C and therewith counterweights 74A–74C. Timing belt 82 extends around pulleys 80A–80C and idler pulley 120A. Belt 86 from hydraulic motor 88 drives drive sleeve 84 which, in turn, drives pulley 85 and therewith drive belt 83 and drive pulley 81. Shaft 76C is thereby rotated, with pulley 80C, timing belt 82 and counterweight 74C rotating therewith. Timing belt 82 rotates pulleys 80A, 80B, driving counterweights 74A, 74B on shafts 76A, 76B.

Figure 5:
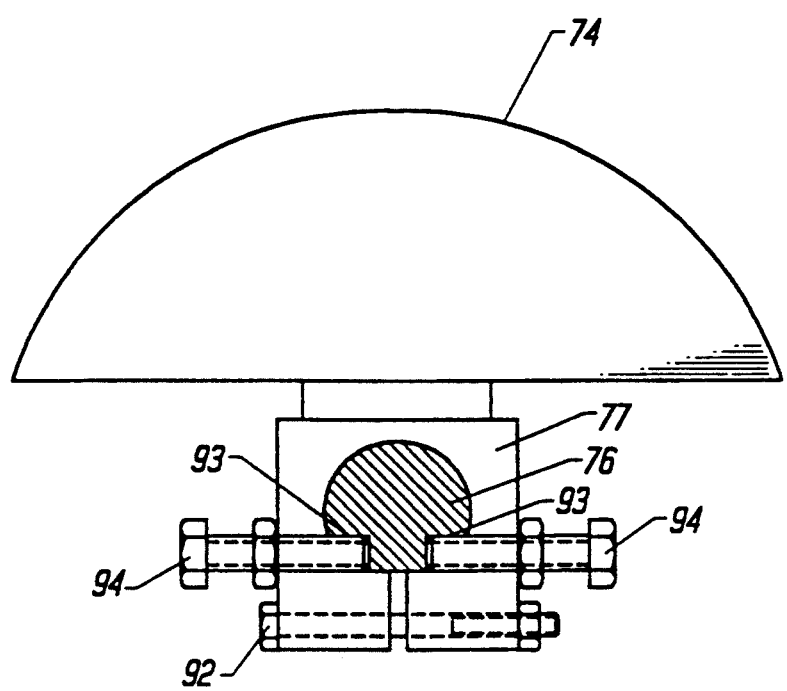
FIG. 5 is a sectional view of a counterweight in the counterweight mechanism of FIG. 3.

Timing belt 82 engages each of pulleys 80A–80C such that counterweights 74A–74C are rotated in a phased relationship. Where three counterweights are used as shown in FIGS. 4–5, the counterweights are rotated 120° out of phase. To accomplish this phased relationship, the angle between two adjacent counterweights is set at 120° by rotating the counterweights 74, shafts 76 and pulleys 80 keyed thereto. When the proper orientation of the counterweights has been achieved, timing belt 82 is tensioned around pulleys 80 using pivot plate 122A as described above to maintain the pulleys, shafts, and counterweights in the phased relationship. In an alternative embodiment, pulleys 80 have teeth about their perimeter to engage corresponding teeth on the inner surface of timing belt 82 to assist in maintaining the necessary phased relationship between the counterweights.

Referring to FIG. 5, counterweights 74 include a split mounting flange 77 with an aperture dimensioned so that the flange can be slipped over shaft 76. Shaft 76 has a pair of longitudinal channels 93 into which opposing set screws 94 extend, allowing counterweight 74 to be adjustably and nonrotatably keyed to shaft 76. By adjusting the relative positions of screws 94, the angular position of weight 74 on shaft 76 can be finely adjusted to precisely adjust the relative position of the weights to obtain the necessary phased relationship.

Figure 6:
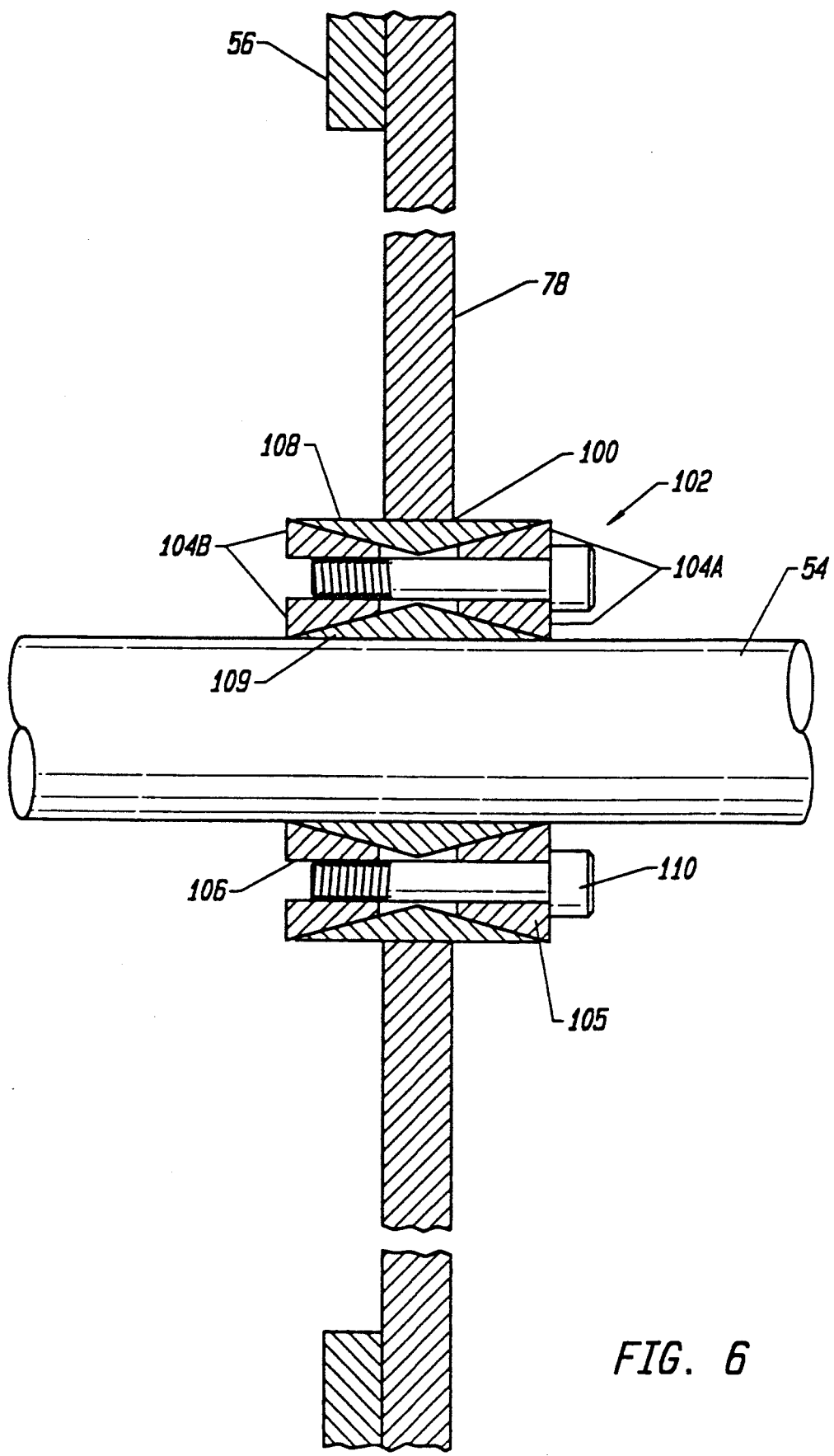
FIG. 6 is a front cross-sectional view of a support member in the counterweight mechanism of FIG. 3.

FIG. 6 illustrates an exemplary embodiment of the attachment of vibratory drive 72 and hub 46 of drum 48 to shaft 54. Support members 78 of the vibratory drive are fixed to drum end plate 56 by welding or fasteners. A central aperture 100 is provided at the center of rotation of support member 78, through which shaft 54 extends. A locking assembly 102 clamps support member 78 to shaft 54. Locking assembly 102 consists of a pair of tapered rings 104 of wedge-shaped cross-section disposed about shaft 54, one of the rings 104A having several concentric holes 105 extending axially therethrough, and the other of rings 104B having threaded concentric axial holes 106 aligning with holes 105. A first tapered split sleeve 108 is disposed about shaft 54 around rings 104A and 104B, an outer surface of sleeve 108 contacting support member 78 in aperture 100. A second tapered split sleeve 109 is disposed about shaft 54 between the shaft and rings 104A, 104B. Cap screws 110 extend through holes 105 and engage threads in holes 106. When cap screws 110 are tightened, tapered rings 104A, 104B are pulled toward each other, forcing split sleeve 108 outwardly against member 78 and split sleeve 109 inwardly against shaft 54. Locking assembly 102 thus provides a high-strength coupling between shaft 54 and support member 78 which may be axially positioned on shaft 54 and locked in position without axial movement as cap screws 110 are tightened.

The rotation of the counterweights on shafts 76 journalled to support members 78 superimposes onto the constant rotation of the drum a vibratory or oscillating motion which cyclically accelerates and decelerates the angular velocity of the drum. The frequency of oscillation is a function of the speed with which the counterweights are driven, each of the weights making a complete revolution during each acceleration/deceleration cycle in the angular velocity of the drum. The amplitude of the acceleration/deceleration increases as a function of the mass of the counterweights and their eccentricity with respect to shafts 76.

The vibratory oscillations cyclically accelerate and decelerate the hub as it rotates in the direction of fruit flow. By appropriate selection of the drum speed and the mass of the counterweights, one can select, for example, to cause a momentary reversal of the direction of movement of the drum during each vibration cycle. Optimal conditions can thereby be created in the drum shaker of the present invention to assure that the inertial forces acting on the kernels or fruit of the harvested crop are of sufficient magnitude, frequency and duration to affect their separation from the plant growth.

It should be understood that the vibratory drive 72 could be mounted within the interior of hub 48, rather than extending laterally outward from end plate 56 as shown in FIGS. 2–4. By mounting drive 72 within hub 48, the additional space required for the drive on the harvester can be minimized. However, the radial spacing of counterweights 74 from shaft 54 will be constrained by the diameter of hub 48, which is limited by harvester size, power requirements and other factors. Where greater oscillation amplitude is sought, either the radial spacing of the counterweights must be increased, or the size and weight of the counterweights increased. If radial spacing has been maximized, there is left only the alternative of higher weight. However, it is often desirable to minimize the weight of the harvester due to the softness of the ground where crops are harvested. Therefore, depending upon the oscillation amplitude desired for the particular crop, the mounting configuration of FIGS. 2-4 is usually preferred.

Figure 7A:
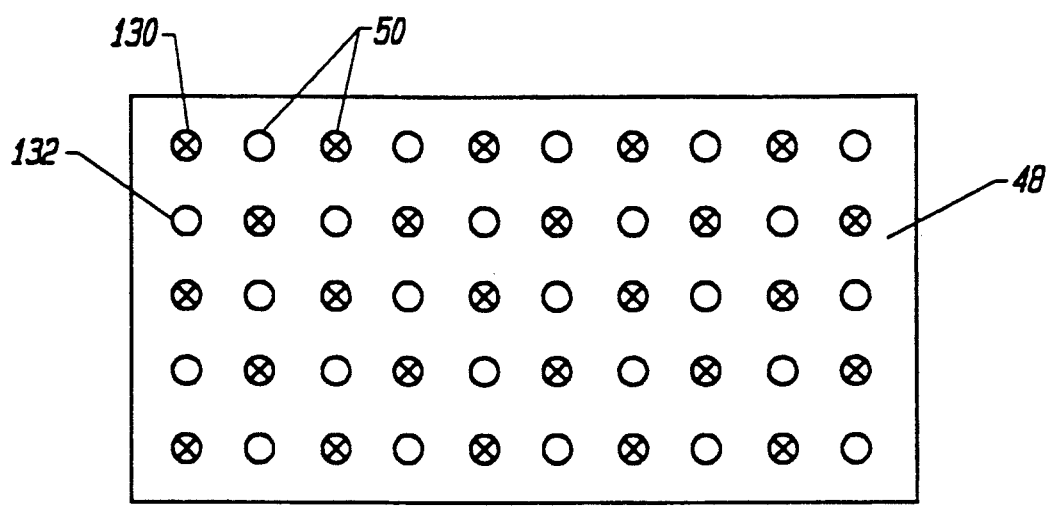
FIGS. 7A–7C are front elevational views of the hub and tines of the drum shaker of FIG. 2
Figure 7B:
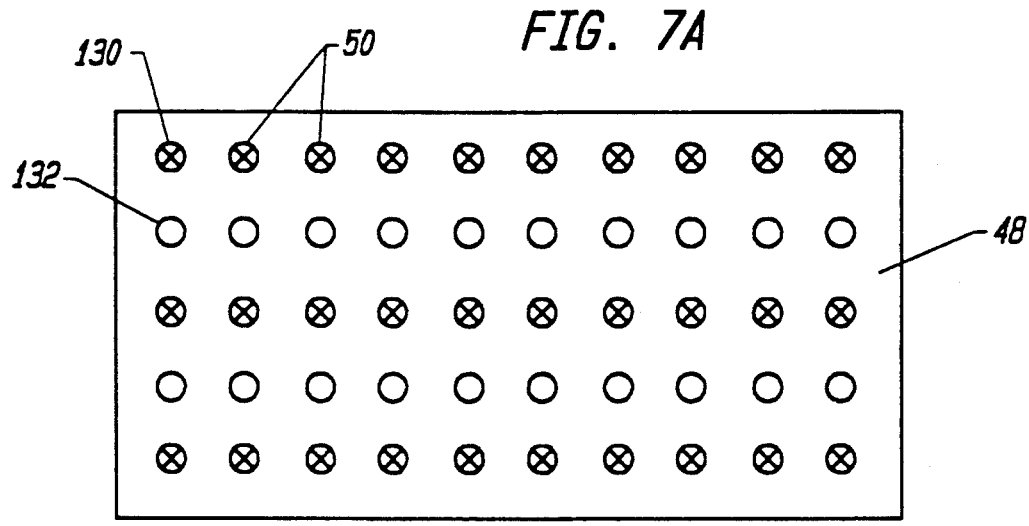
Figure 7C:
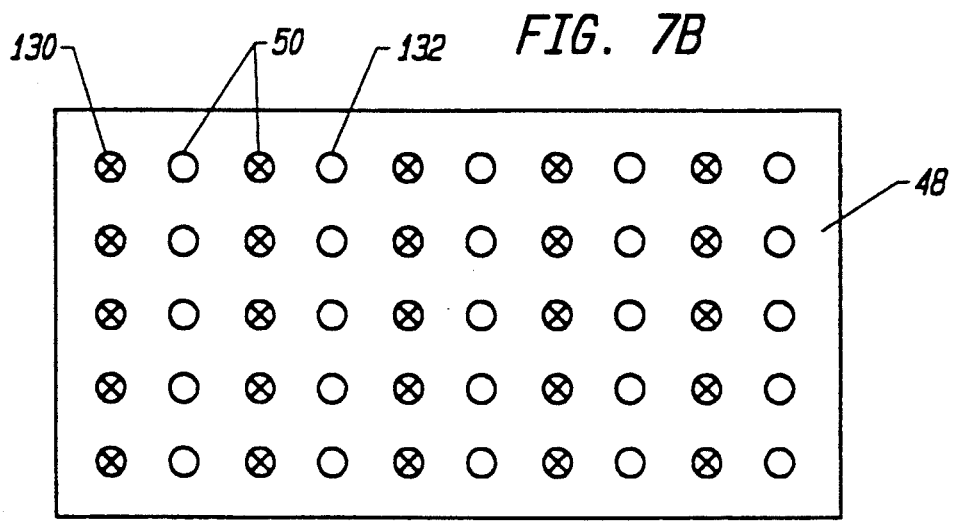

The improved tines 50 of the present invention will now be described with reference to FIGS. 7A-7C. Tines 50, as described above, extend outwardly from a hub 48 and are arranged on the surface of the hub in a series of circumferential and longitudinal rows. In a preferred embodiment, usually in seed harvesters, two types of tines are provided, one relatively stiff, and the second relatively flexible. The tines may be arranged on the hub 48 in various configurations, three of which are shown in FIGS. 7A-7C. In FIG. 7A, stiff tines 130 shown shaded in the figure, are alternated with flexible tines 132, shown unshaded, such that each stiff tine is adjacent a flexible tine in both the longitudinal and circumferential directions. In a second configuration, shown in FIG. 7B, longitudinal rows entirely of stiff tines 130 are alternated with longitudinal rows entirely of flexible tines 132. In a third configuration, shown in FIG. 7C, circumferential rows are made up of either all stiff tines 130 or all flexible tines 132, the rows of stiff tines being alternated with rows of flexible tines.

In another embodiment, the relative difference in flexibility between adjacent tines is achieved by hingedly mounting a portion of the tines to hub 48. In this embodiment, the stiffness of the material of the tines may be the same for all tines, with greater flexibility being obtained by mounting certain of the tines to the hub by a hinge or other deflectable mounting means (not illustrated). Such deflectable mounting means may comprise, for example, a resilient spring or elastomeric tube fixed to the surface of hub 48, to which the base of a tine 50 is attached.

By alternating stiff and flexible tines, improved disengagement of fruit or seeds from the plant portions of crop is obtained. When the tines engage the crops as hub 48 rotates in its oscillating motion, the flexible tines tend to remain substantially stationary relative to the stiffer tines. Thus, the adjacent stiff and flexible tines tend to move in a shearing motion relative to each other, so that a flexible tine holds the plant portion stationary while the stiffer tine moves along the plant portion stripping the fruit or seeds therefrom. Thus, the improved shaker of the present invention disengages fruit or seeds from the stem portions of crops not only by shaking the stems, but by a simultaneous stripping action, the combined effect being a substantially improved harvesting efficacy.

Figure 8A:
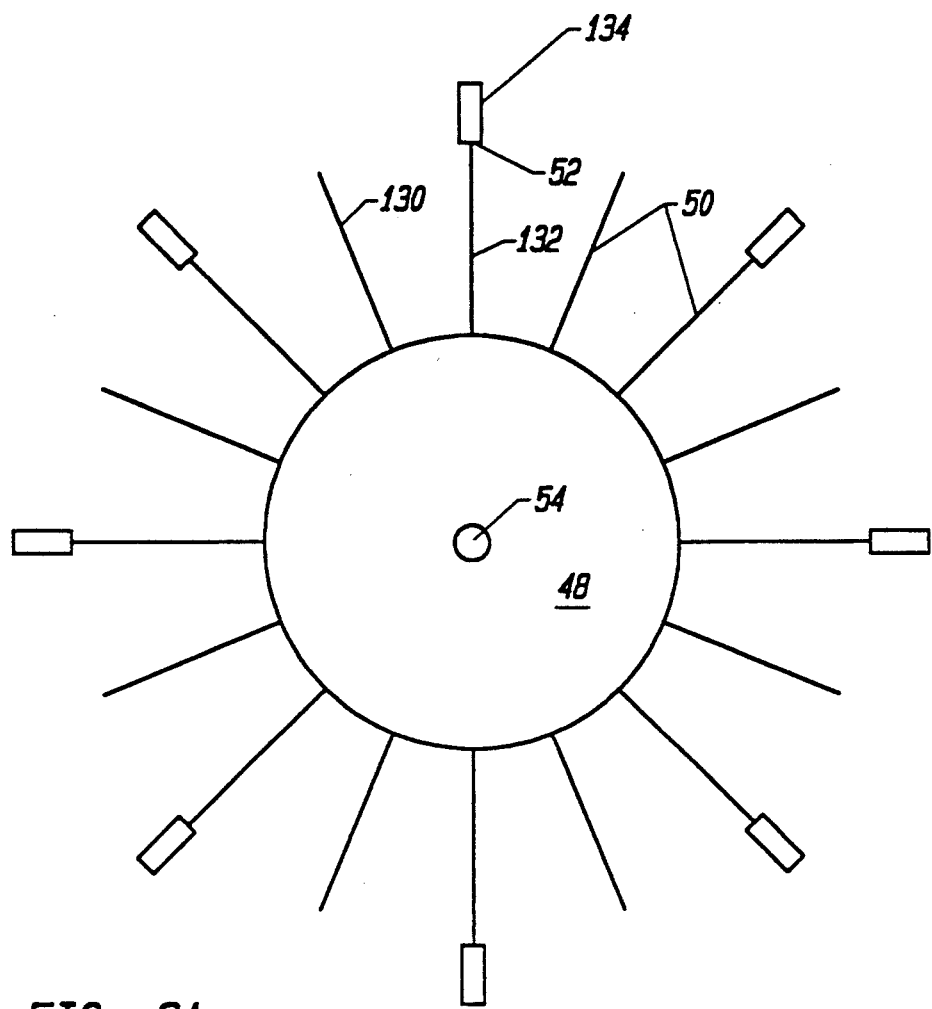
FIGS. 8A and 8B are side elevational views of the hub and tines of the drum shaker of FIG. 3.

In a further preferred embodiment, the tines are provided with weighted tips, as shown in FIG. 8A. Weights 134, which may be, for example, steel or other heavy, durable material, are attached to free ends 52 of tines 132. preferably, only limp tines 132 are provided with weighted tips. Weights 134 increase the relative movement of flexible tines 132 and stiff tines 130, thereby increasing the shearing action described above.

Figure 8B:
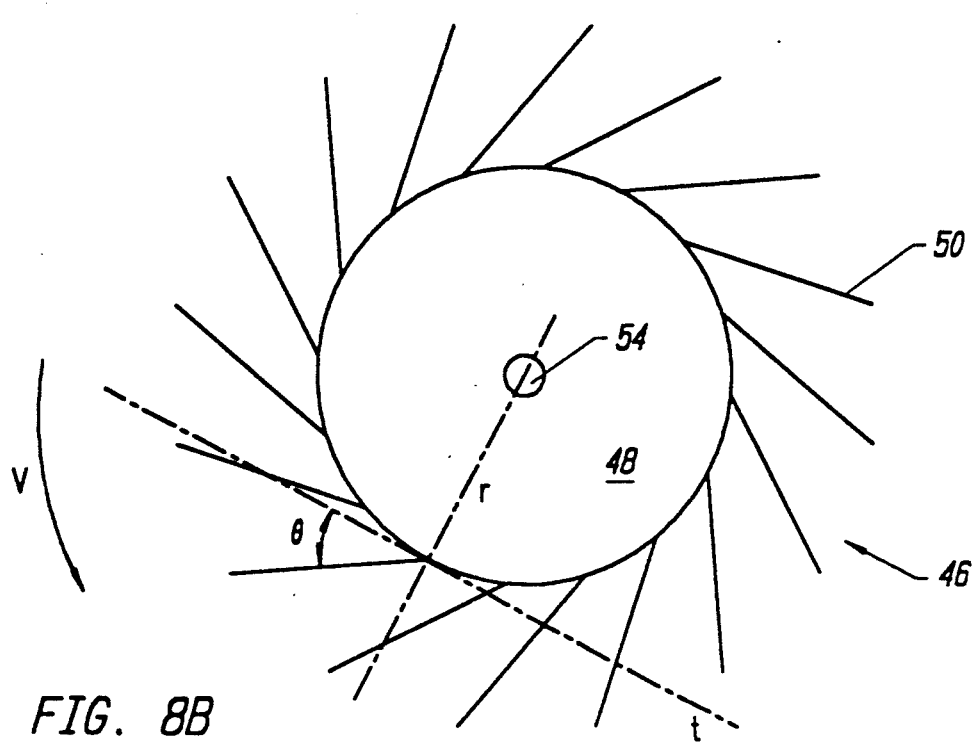

FIG. 8B illustrates another exemplary embodiment of tines 50 on hub 48. It is frequently desirable, especially when harvesting tomatoes, to repel the vine material of the plants away from the drum to prevent the vines from entangling in tines 50 and accumulating near the surface of hub 48. To achieve this, tines 50 may be mounted to hub 48 at an angle $\theta$ which is less than 90° from the tangential direction t, the drum being rotated in the direction of arrow v. When tines 50 engage plant material, their angular orientation relative to the direction of motion will tend to repel plant material away from hub 48 to avoid entanglement therewith. The angle $\theta$ of tines 50 relative to hub 48 will vary depending upon the type of crop being harvested, ranging from the radial direction r ($\theta = 90°$) to approximately 10° from the tangential direction t.

While the above is a complete description of the preferred embodiments of the invention, various alternatives and modifications and equivalents may be used. For example, the drum shaker of the present invention could be used in a harvester in which a conveyor moves beneath the drum shaker to transport the plant material, with the hub and tines being subject only to oscillating motion, without a constant angular speed. Further, while the shaker mechanism has been described in conjunction with a tomato harvester, the shaker mechanism may be used in harvesters for a variety of crops, including any seed crops, fruits or vegetables capable of being harvested using the vibrational motion imparted by the drum shaker of the present invention. Therefore, the above description should not be taken as limiting the scope of the invention which is defined by the appended claims.

What is claimed is:

1. Apparatus for producing oscillation of a body rotatable about a first axis, the apparatus comprising:
   at least three rotatable counterweights arranged in a single plane and coupled to the body, each counterweight having a center of mass, the axis of rotation of each counterweight being spaced apart from its center of mass and spaced apart from said first axis; and
   means for rotating the counterweights in a phased relationship relative to each other.

2. The apparatus of claim 1 wherein said body is a shaker in a crop harvester for disengaging fruit from stem portions of the crop, the shaker comprising:
   a drum rotatable about the first axis; and
   a plurality of tines extending from the drum, the tines engaging the stem portions;
   wherein the counterweights are coupled to the drum.

3. The apparatus of claim 2 further comprising means for rotating the drum about the first axis.

4. The apparatus of claim 2 wherein the tines comprise a first type and a second relatively flexible type, said first and second types being arranged such that each of said first type is adjacent at least one of said second type.

5. A shaker for use in a crop harvester for disengaging fruit from stem portions of the crop, the shaker comprising:
   a drum rotatable about a first axis;
   a plurality of tines extending form the drum; and
   means coupled to the drum for rotationally oscillating the drum, said oscillation means comprising:
      at least three rotatable counterweights disposed in a common plane perpendicular to the first axis, each counterweight having an axis of rotation spaced apart from the first axis and spaced apart from a center of mass of the counterweight; and
      means for rotating the counterweights in a phased relationship;
   wherein rotating the counterweights causes cyclical rotational acceleration and deceleration of the drum and tines, thereby disengaging the fruit.

6. The shaker of claim 5 wherein said oscillation means has an odd number of counterweights.

7. The shaker of claim 5 wherein the means for rotating the counterweights comprises:
   a first motor;

means coupled to the first motor for driving at least a first of the counterweights; and means coupled to said first counterweight and to each other counterweight for maintaining said phased relationship.

8. The shaker of claim 5 further comprising means for rotating the drum.

9. The shaker of claim 8 wherein said drum rotation means comprises:

a second motor for rotating said drum; and means for isolating the second motor from the oscillation of the drum.

10. The shaker of claim 5 wherein the tines comprise a first and a second type, the first type being relatively stiff and the second type being relatively flexible, the first and second types being arranged in an alternating configuration on said drum.

11. The shaker of claim 5 wherein each tine is disposed at a non-zero angle relative to a radial direction, said radial direction being perpendicular to said first axis and intersecting a point on the tine.

12. A shaker for use in a crop harvester for disengaging fruit from stem portions of the crop, the shaker comprising:

a rotatable drum;

a plurality of tines of equal length and of varied stiffness extending radially from the drum; and means for rotationally oscillating the drum, wherein oscillation of the drum causes some of said tines to move relative to others of said tines, facilitating disengagement of the fruit.

13. The shaker of claim 12 wherein the tines comprise a first type and a second type, the first type being relatively stiff and the second type being relatively flexible.

14. The shaker of claim 13 wherein both of said first and second types of tines have sufficient stiffness to extend substantially straight from the drum in a radial direction when said distal ends are free of contact.

15. The shaker of claim 13 wherein the tines are arranged in circular rows around the drum, alternating the first and second types of tines by row.

16. The shaker of claim 13 wherein the tines are arranged in longitudinal rows across the drum, alternating the first and second types of tines by row.

17. The shaker of claim 13 wherein the first and second types of tines are arranged in an alternating manner by tine, such that each tine of the first type has a tine of the second type adjacent to it in both the longitudinal and circumferential directions.

18. The shaker of claim 13 wherein the second type of tines have a weighted tip.

19. The shaker of claim 12 wherein the means for oscillating the drum comprises:

at least three rotatable counterweights, each counterweight having an axis of rotation spaced apart form the first axis and spaced apart from a center of mass of the counterweight; and means for rotating the counterweights in a phased relationship, said rotation causing cyclical rotational acceleration and deceleration of the drum.

20. An apparatus for disengaging fruit from stem portions of a harvested crop, the apparatus comprising:

a drum rotatable about a first axis;

a plurality of tines of varied stiffness extending radially from the drum;

means coupled to the drum for rotationally oscillating the drum, said oscillation means comprising:

at least three rotatable counterweights at a given axial end of the drum and arranged in a common plane, each counterweight having an axis of rotation spaced part form the first axis and spaced apart from a center of mass of the counterweight; and means for rotating the counterweights in a phased relationship;

wherein rotating the counterweights causes cyclical rotational acceleration and deceleration of the drum and tines, thereby disengaging the fruit.

21. The apparatus of claim 20 wherein the number of counterweights is an odd number.

22. The apparatus of claim 20 wherein the tines comprise a first and a second type, the first type being relatively stiff and the second type being relatively flexible, the first and second types being arranged in an alternating configuration on the drum.

23. A shaker for use in a crop harvester for disengaging fruit from stem portions of the crop, the shaker comprising:

a drum mounted to a first shaft and rotatable about a first axis;

a plurality of tines extending form the drum;

means for rotationally oscillating the drum, said oscillation means comprising:

a frame coupled to the first shaft;

at least three counterweights rotatably coupled to the frame and being disposed in a common plane which is perpendicular to the first axis, each counterweight having an axis of rotation spaced apart from the first axis and spaced apart from a center of mass of the counterweight;

a plurality of pulleys, one of the pulleys being mounted to each counterweight;

a first motor for rotating the counterweights; and a plurality of belts coupling said pulleys to the first motor such that the counterweights rotate in a phased relationship;

a second motor for rotating the drum; and a coupling between the second motor to the first shaft allowing the rum to rotate independently of the oscillation;

wherein said drum rotates continuously while oscillating cyclically, the tines engaging said stem portions and disengaging the fruit.

24. The drum shaker of claim 23 wherein said tines comprise a first and a second type, said first type being relatively stiff and said second type being relatively flexible, said first and second types being arranged in an alternating configuration on the drum.

25. The apparatus of claim 1 wherein said single plane is perpendicular to the first axis.

* * * * *